United States Patent [19]

Racki

[11] Patent Number: 4,477,911

[45] Date of Patent: Oct. 16, 1984

[54] INTEGRAL HEAT PIPE-ELECTRODE

[75] Inventor: Daniel J. Racki, Greensburg, Pa.

[73] Assignee: Westinghouse Electric Corp., Pittsburgh, Pa.

[21] Appl. No.: 446,151

[22] Filed: Dec. 2, 1982

[51] Int. Cl.³ .......................... H05B 3/60; H05B 3/78
[52] U.S. Cl. ...................................... 373/36; 373/117
[58] Field of Search ...................... 373/93, 36, 37, 38, 373/27, 88, 117; 165/104.26

[56] References Cited

U.S. PATENT DOCUMENTS 3,375,314 3/1968 Sinner ................................ 373/36
4,287,045 9/1981 Lechevallier et al. ............... 373/93

Primary Examiner—Roy N. Envall, Jr.
Attorney, Agent, or Firm—W. D. Palmer

[57] ABSTRACT

An integral heat pipe-electrode for molten metal baths having a vapor deposition coating on an inner surface of a hole forming the heat pipe to protect the copper of the electrode from the heat pipe fluid.

11 Claims, 5 Drawing Figures

INTEGRAL HEAT PIPE-ELECTRODE

BACKGROUND OF THE INVENTION

This invention relates to electrodes used to heat molten material especially a bath of molten metal or glass. Such electrodes usually extend into a container having a volume of molten material, and penetrate below the surface of the molten pool. The electrode is used to supply electrical energy to the molten material.

The extremely large amount of heat generated in the electrode requires an elaborate cooling system. Commonly, a heat pipe is coaxially incorporated within the electrode. The operational principles of a heat pipe are well known and are described in various sources including U.S. Pat. Nos. 3,865,184 and 3,753,364. Briefly stated, a heat pipe is a thermosiphon of vaporization constituted by a reservoir of good heat conducting quality, forming a closed circuit the interior wall of which is lined with a metallic mesh constituting a capillary structure. One end of the heat pipe is heated and the other end is cooled. Within the heat pipe, a continuous cycle of evaporation condensation occurs, transferring heat axially toward the cooler end.

The problem to be solved by this invention is to design a simpler electrode.

SUMMARY OF THE INVENTION

An electrode having an integral heat pipe having a vapor deposition coating for material compatibility between the electrode and heat pipe transfer fluid.

DETAILED DESCRIPTION OF THE PREFERRED EMBODIMENT

Figure 1:
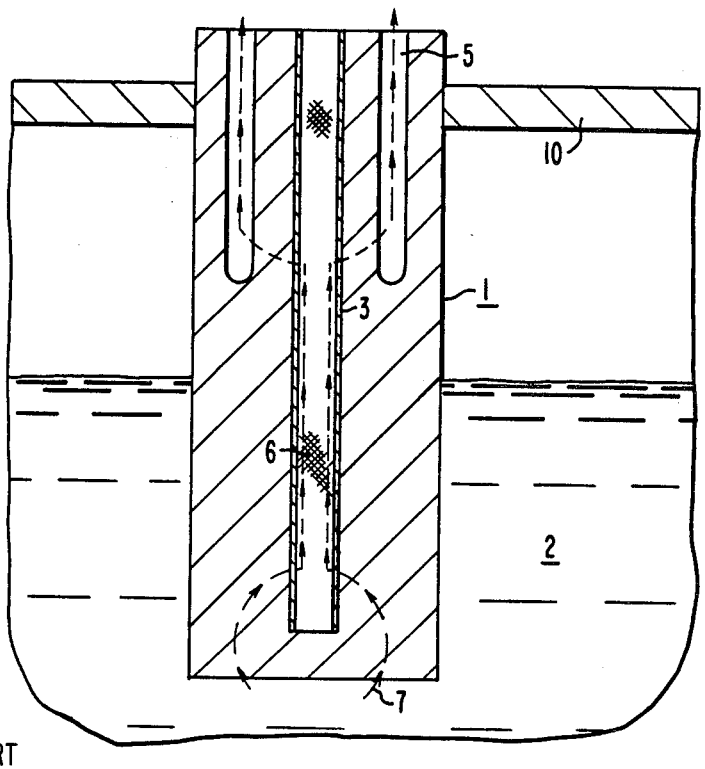
FIG. 1 is a longitudinal section of a prior art electrode.

Refer to FIG. 1 which represents the state-of-the-art electrodes. Electrode 1 extends into a container 10 holding a bath 2 of molten aluminum. Typically, electrode 1 is an eight foot long copper cylinder of one foot diameter. A two inch diameter heat pipe 3, seven feet long, is shrunk fit into a hole bored into the electrode. Plenum 4 contains a substance, usually potassium or mercury which is the heat pipe transfer medium. The upper end of the electrode has a water cooling jacket system 5. FIG. 1 also shows a portion of the mesh 6 which is the capillary system of the heat pipe. Arrows 7 illustrate heat flow.

Figure 2:
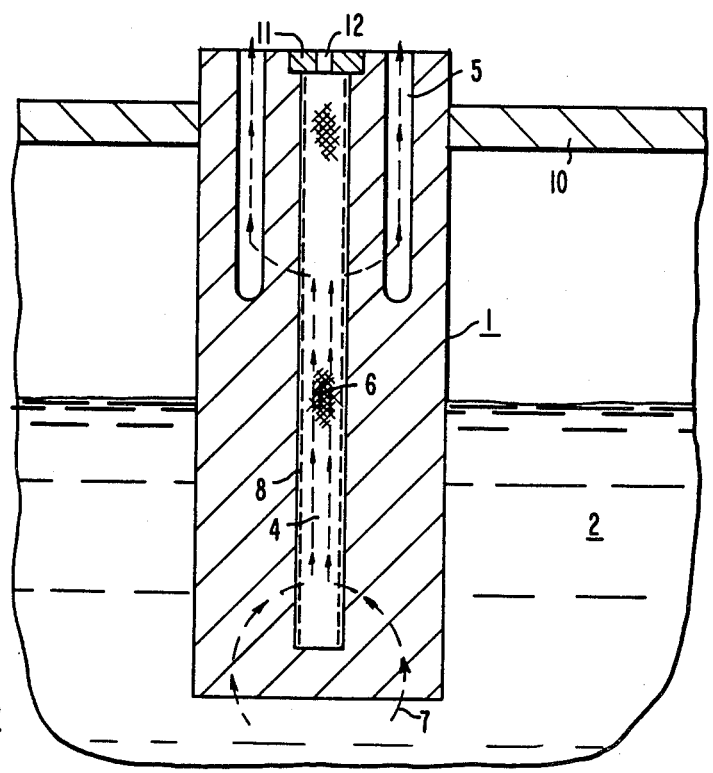
FIG. 2 is a longitudinal section of an electrode of a first embodiment.

Refer to FIG. 2 which illustrates a first embodiment of an improved integral heat pipe electrode. Items 1, 2, 4, 5, 6, 7 and 10 aree identical to FIG. 1, but component 3, a pipe which is part of the heat pipe system of FIG. 1 is omitted in FIG. 2. The plenum formed by a two inch bored hole in the electrode itself is used as the heat "pipe". The inner surfaces of the bored hole and coated with a 30 mil thickness of molybdenum, nickel, or stainless steel, by vapor deposition to protect the copper of the electrode from interaction with the mercury or potassium fluid in plenum 4. This protective coating is represented by a dotted line 8 in FIG. 2. FIG. 2 also shows a seal plug 11 and an access plug 12 to plenum 4.

Figure 3:
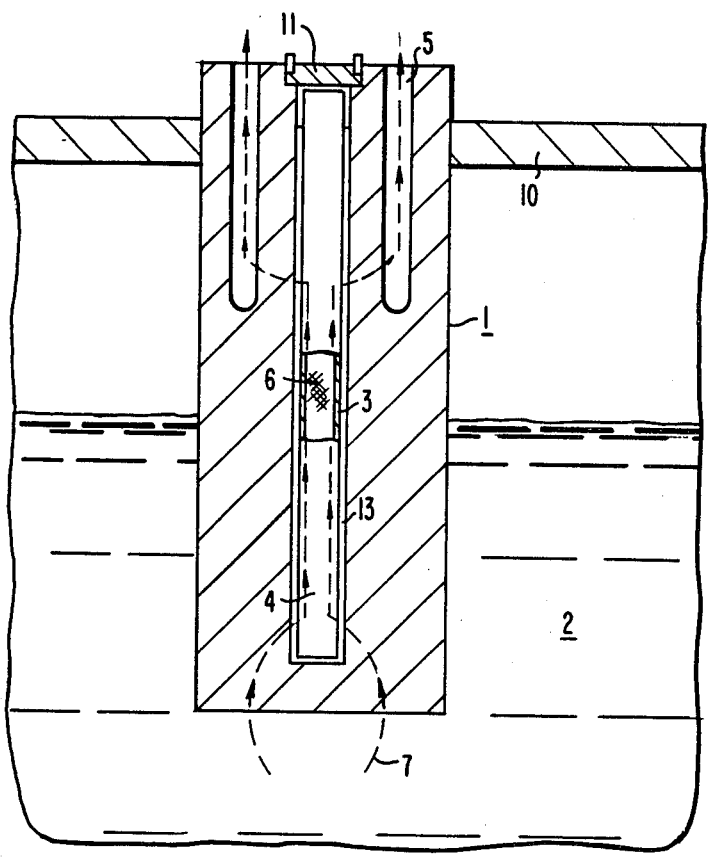
FIG. 3 is a longitudinal section of an electrode of a second embodiment.

Refer to FIG. 3 which illustrates a second embodiment of an improved integral heat pipe electrode. Items 1, 2, 4–7, 10 and 11 are identical to FIG. 2, and in this embodiment, a heat pipe 3 is used which has a diameter less than two inches such that a plenum 13 is formed between electrode 1 and pipe 3. Plenum 13 is filled with a heat conductive substance such as mercury potassium, or lead-bismuth. The vapor depositon coating on the inner surface of the bored hole in electrode 1, shown as dotted line 8 in FIG. 2, is an option with the second embodiment but is omitted in FIG. 3 for clarity. It is preferred that heat pipe 3 be removable for replacement or maintenance.

Figure 4:
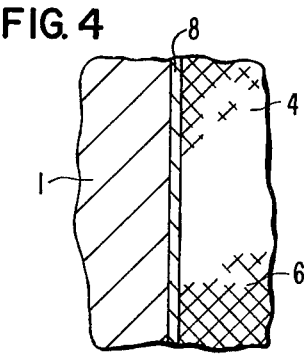
FIG. 4 is a fragmentary enlarged sectional view of a portion of the first electrode embodiment as shown in FIG. 2.
Figure 5:
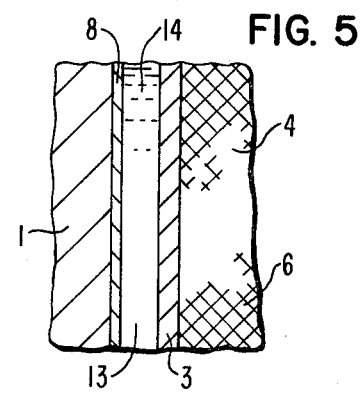
FIG. 5 is a fragmentary enlarged sectional view of a portion of the second electrode embodiment as shown in FIG. 3.

FIGS. 4 and 5 are fragmentary enlarged sectional views of the electrode embodiments which are respectively shown in FIGS. 2 and 3 and these views particularly illustrate the positioning of the vapor-deposited metallic layer 8. In FIG. 5, the plenum 13 which is positioned between the heat pipe 3 and the vapor-deposited metallic layer 8 is filled with liquid heat-conductive substance 14, as described hereinbefore.

I claim:

1. An electrode for conducting electrical energy to heat a molten material bath, and heat pipe cooling means forming a part of said electrode, said electrode comprising:
    an elongated copper body having one lower end thereof adapted to be immersed in said molten bath, and the other upper end of said elongated copper body adapted to project above said molten bath;
    an axially extending and elongated aperture provided in said elongated copper body and terminating within said copper body proximate said one lower end of said copper body, said aperture being sealed proximate said other upper end of said copper body, and a filling within said aperture comprising heat-transfer substance;
    a vapor-deposited thin metallic layer which is non-reactive with said heat-transfer substance carried on all copper surfaces of said aperture, and a non-reactive metallic mesh extending within said aperture to act as a capillary for said heat-transfer substance during operation of said electrode; and
    cooling means comprising a water-cooled jacket positioned proximate the upper portion of said copper body to remove heat from said heat-transfer substance during electrode operation, with the cooled heat-transfer substance then being conveyed by said non-reactive capillary metallic mesh to the lower end of said copper body to effect a continuous cooling thereof during electrode operation.

2. The electrode as specified in claim 1, wherein said heat-transfer substance is one of potassium and mercury.

3. The electrode as specified in claim 1, wherein said molten bath is one of molten aluminum and molten glass.

4. The electrode as specified in claim 1, wherein said vapor-deposited thin metallic layer is one of molybdenum nickel and stainless steel.

5. The electrode as specified in claim 4, wherein said vapor-deposited thin metallic layer has a thickness of about thirty mils.

6. An electrode for conducting electrical energy to heat a molten material bath, and heat pipe cooling means forming a part of said electrode, said electrode comprising:

an elongated copper body having one lower end thereof adapted to be immersed in said molten bath, and the other upper end of said elongated copper body adapted to project above said molten bath, an axially extending and elongated aperture provided in said elongated copper body and terminating within said copper body proximate said one lower end of said copper body, said aperture being sealed proximate said other upper end of said copper body, and a vapor-deposited thin non-reactive metallic layer carried on all copper surfaces of said aperture;

a separate heat pipe axially extending within said aperture and having an exterior diameter smaller than the diameter of said metallic-layer-coated aperture, a filling within said heat pipe comprising heat-transfer substance, a non-reactive metallic mesh extending within said heat pipe to act as a capillary for said heat-transfer substance during operation of said electrode, and the space between the exterior surface of said separate heat pipe and the surface of said metallic-layer-coated aperture being filled with liquid heat-conductive substance; and cooling means comprising a water-cooled jacket positioned proximate said upper portion of said copper body to remove heat from said heat-transfer substance during electrode operation, with the cooled heat-transfer substance then being conveyed by said non-reactive capillary metallic mesh to the lower end of said copper body to effect a continuous cooling thereof during electrode operation.

7. The electrode as specified in claim 6, wherein said vapor-deposited thin metallic layer is one of molybdenum, nickel and stainless steel.

8. The electrode as specified in claim 7, wherein said vapor-deposited thin metallic layer has a thickness of about thirty mils.

9. The electrode as specified in claim 6, wherein said heat-transfer substance is one of potassium and mercury.

10. The electrode as specified in claim 6, wherein said liquid heat-conductive substance is one of potassium, mercury and lead-bismuth.

11. The electrode as specified in claim 6, wherein said molten bath is one of molten aluminum and molten glass.

* * * * *